(12) United States Patent
Turk et al.

(10) Patent No.: US 6,786,538 B1
(45) Date of Patent: Sep. 7, 2004

(54) REINFORCING FRAME STRUCTURE FOR A VEHICLE ROOF

(75) Inventors: Daniel Turk, Dublin, OH (US); Sachin K. Raje, Dublin, OH (US); Christopher S. Weatherbie, Marysville, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/453,185

(22) Filed: Jun. 3, 2003

(51) Int. Cl.[7] .................................................. B60J 7/00
(52) U.S. Cl. ................................ 296/216.01; 296/210
(58) Field of Search ........................ 296/216.01, 216.07, 296/216.08, 210

(56) References Cited

U.S. PATENT DOCUMENTS

| | | | |
|---|---|---|---|
| 3,016,263 A | | 1/1962 | Rehmann |
| 4,159,144 A | | 6/1979 | Ehlen et al. |
| 4,243,261 A | * | 1/1981 | Trenkler ..................... 296/213 |
| 4,416,487 A | * | 11/1983 | Hirotani et al. ............ 296/222 |
| 4,601,511 A | | 7/1986 | Nakamura et al. |
| 4,659,139 A | | 4/1987 | Hisaminato et al. |
| 4,932,713 A | | 6/1990 | Kubota |
| 5,100,197 A | | 3/1992 | Ichinose et al. |
| 5,681,076 A | | 10/1997 | Yoshii |
| 6,220,653 B1 | | 4/2001 | Welsch et al. |

FOREIGN PATENT DOCUMENTS

| | | | | |
|---|---|---|---|---|
| DE | 3420781 | * | 1/1985 | ................. 296/210 |
| WO | WO 8505604 | * | 12/1985 | ................. 296/210 |

* cited by examiner

*Primary Examiner*—Dennis H. Pedder
(74) *Attorney, Agent, or Firm*—Carrier, Blackman & Associates, P.C.; William D. Blackman; Joseph P. Carrier

(57) ABSTRACT

A reinforcing support frame structure, for use in a roof portion of a vehicle body, includes a panel enclosure with an opening for supporting a roof panel therein. The panel enclosure includes an intermediate portion, which may have two parts situated at different levels, with a curved border therebetween. The reinforcing frame also includes a brace operatively attached to the panel enclosure. The brace may include a triangular portion, having a narrow end facing toward the opening of the panel enclosure. The reinforcing frame structure may also include a plurality of interconnected crossmembers, which are operatively connected to the panel enclosure. Where used, the crossmembers give additional strength to the structure. The reinforcing frame structure may be substantially symmetrical with respect to a longitudinal axis thereof.

21 Claims, 4 Drawing Sheets

REINFORCING FRAME STRUCTURE FOR A VEHICLE ROOF

BACKGROUND OF THE INVENTION

1. Field of the Invention

The present invention relates to a frame structure for a vehicle roof, in a vehicle equipped with a movable roof panel. More particularly, the present invention relates to a reinforcing frame structure which is adapted to minimize oscillation of the vehicle roof during vehicle operation with the roof panel open.

2. Description of the Background Art

Sunroofs are popular accessories for use with motor vehicles. Unfortunately, it has been observed that in some installations, when a sunroof-equipped vehicle is traveling at certain speeds with the sunroof open, the roof area behind the opening may begin to oscillate as a result of interaction with passing air, producing an unpleasant vibration which can be sensed by a passenger in the vehicle. Sometimes this may create an audible low-frequency noise, which may be referred to as "sunroof booming".

A number of different reinforcing frame structures are known for use in automotive roof sections. Examples of some of the known vehicle roof frame structures, as well as other, more general background art may be found in U.S. Pat. Nos. 3,016,263, 4,159,144, 4,416,487, 4,601,511, 4,659,139, 4,932,713, 5,100,197, 5,681,076 and 6,220,653.

Although the known devices have some utility for their intended purposes, a need still exists in the art for an improved frame structure for installation in a roof portion of a vehicle. In particular, there is a need for an improved frame structure which will resist oscillation of the roof when the sunroof is open and the vehicle is moving.

SUMMARY OF THE INVENTION

The present invention provides a reinforcing frame structure, for use in a roof portion of a vehicle equipped with a sunroof or other movable roof panel.

A reinforcing frame structure according to the present invention includes a panel enclosure surrounding a panel opening, for supporting a roof panel therein. The frame structure includes an intermediate portion adjacent the panel opening.

Optionally, the intermediate portion may be made with adjacent sections thereof offset from one another, including a first part adjacent the panel opening and disposed at a first level, and a second part spaced away from the panel opening and disposed at a second level which is different from the first level. The first and second parts of the intermediate portion may have a curved border therebetween, which may be formed in an undulating shape.

The reinforcing frame structure may include opposed side rails running along the outer side edges thereof. Where used, the side rails are preferably integrally formed with, or affixed to the panel enclosure.

In a particular embodiment of the invention, the reinforcing frame structure also includes a brace operatively attached to the panel enclosure, to reinforce the panel enclosure and to reduce vibration thereof during movement of the vehicle.

The brace may take any one of a number of different forms.

In one embodiment of the invention, the brace has a narrow end adjacent the panel enclosure, and a wide end spaced away from the panel enclosure. The brace may include a geometric portion which is substantially triangular in shape, or which may be made in a modified triangle, with the opposed side edges thereof being bowed outwardly.

The brace may include a plurality of web segments disposed at different angles. Some of these web segments may disposed so as to be non-parallel to the frame's longitudinal axis, and also non-perpendicular to the frame's longitudinal axis. Optionally, some of these web segments may have a substantially triangular outline.

The reinforcing frame structure hereof also includes a plurality of interconnected crossmembers which are operatively connected to the panel enclosure, and which give additional strength to the frame structure. The crossmembers may be interconnected by web segments, if desired.

The reinforcing frame structure hereof may include components forming a substantially symmetrical pattern with respect to a longitudinal axis of the frame structure.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Figure 1:
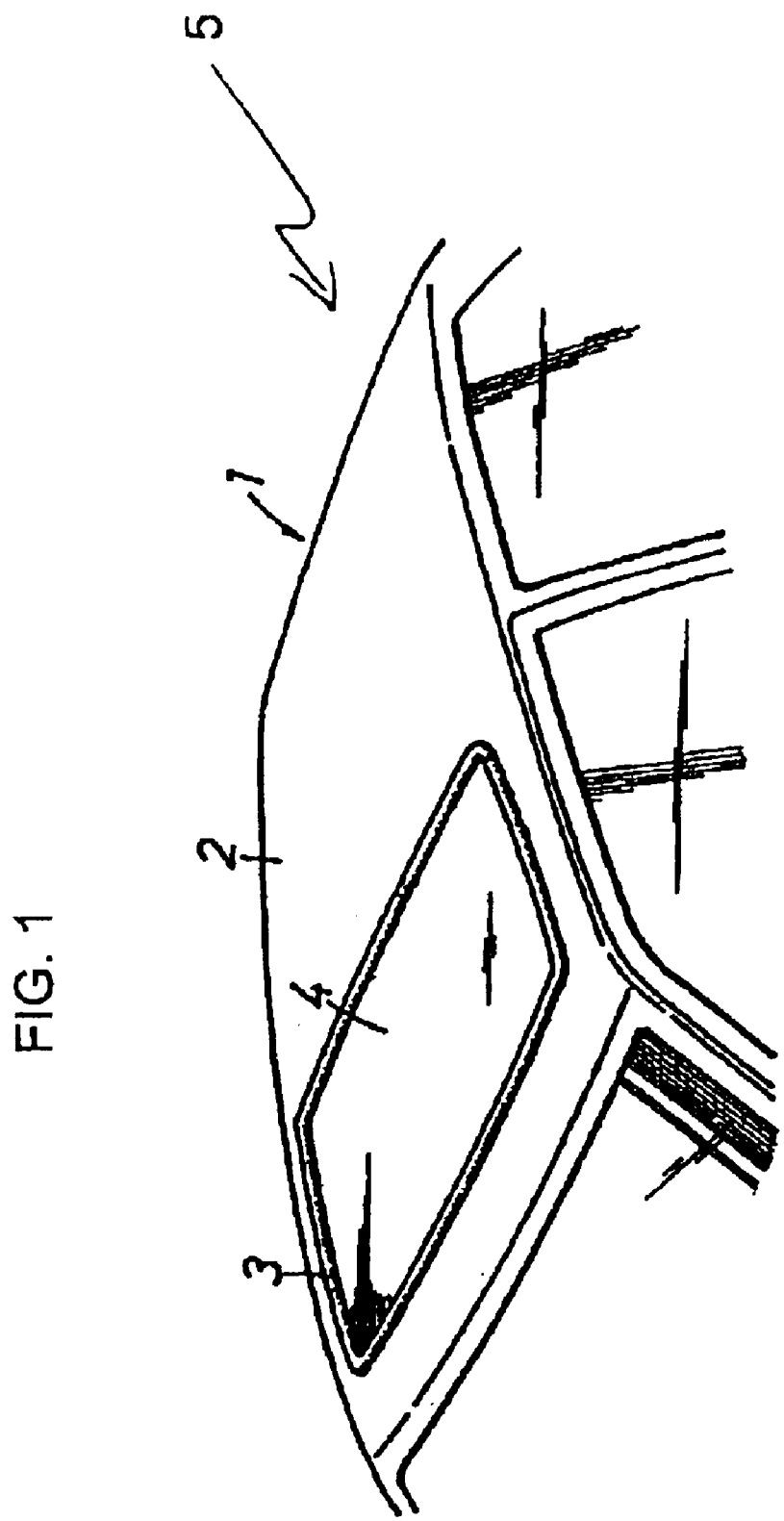
FIG. 1 is a perspective view of a vehicle roof section.

Referring now to FIG. 1, a vehicle 5 is shown, including an upper roof portion 1 having an opening formed therein, with a sunroof frame 3 and a movable sunroof panel 4 installed in the roof opening. It will be understood that the sunroof panel 4 may be a manually or electrically operated panel, and may be pivotally movable, slidably movable, or both. The present invention provides a reinforcing roof structure for placement inside of the roof portion 1 of a vehicle 5 below the upper roof panel 2.

Throughout the present specification, relative positional terms like 'front', 'rear', and the like are used to refer to the preferred orientation of the frame structure as shown in the drawings. Generally, in the present specification, these terms will generally correspond to the front, rear etc. of the vehicle 5 shown in FIG. 1. These terms are used in an illustrative sense to describe the depicted embodiments, and are not meant to be limitative. It will be understood that the described apparatus may be placed at an orientation different from that shown in the drawings, such as inverted front-to-back, 180 degrees to that shown, and in such a case, the above-identified relative positional terms will no longer be accurate.

Figure 2:
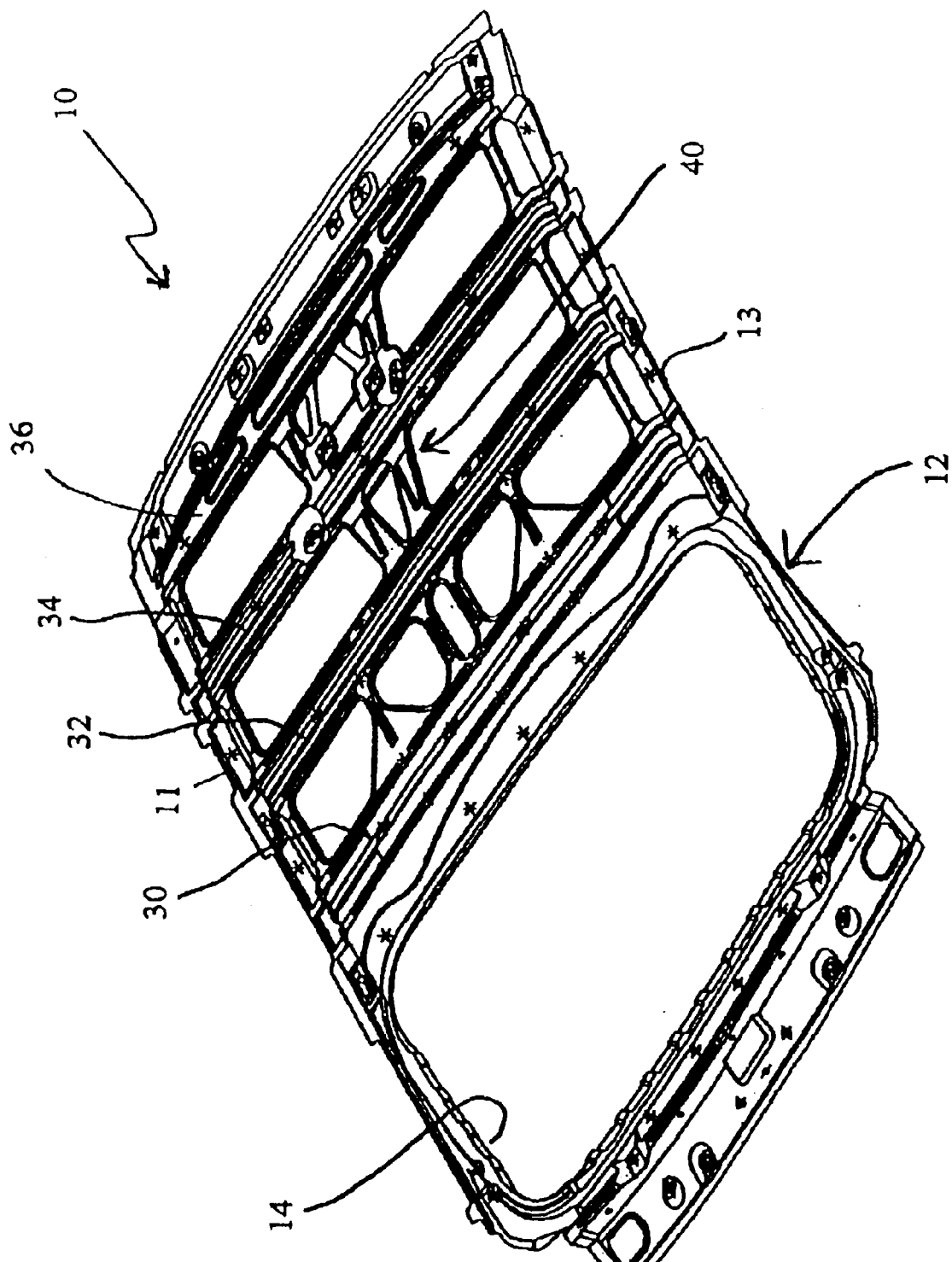
FIG. 2 is a perspective view of a reinforcing frame structure in accordance with an illustrative embodiment of the invention.
Figure 3:
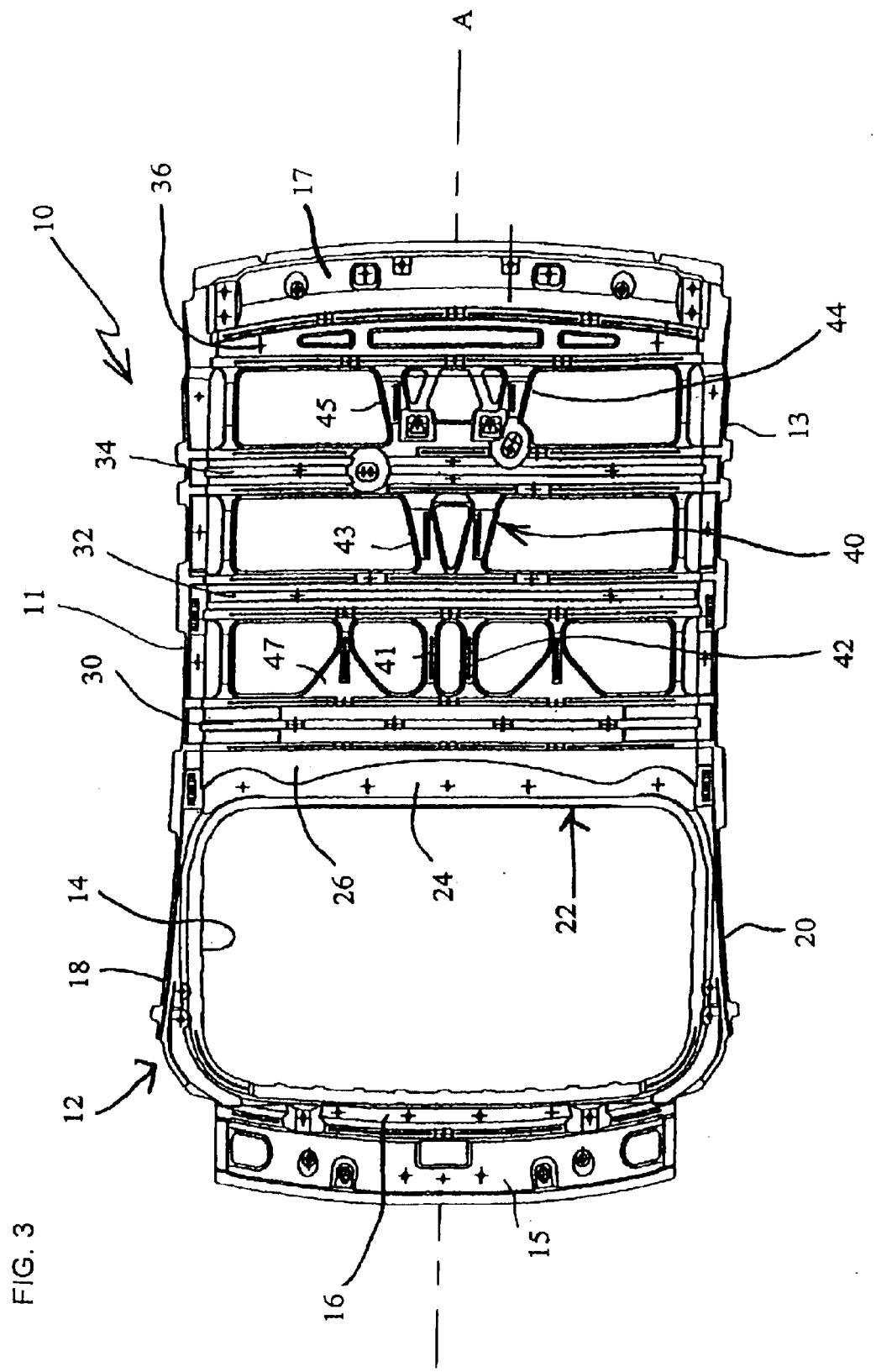
FIG. 3 is a top plan view of the reinforcing frame structure of FIG. 1.

Referring now to FIGS. 2–3 of the drawings, an exemplary illustrative embodiment of a reinforcing support frame structure is shown generally at 10. When installed in a vehicle 5, below the upper roof panel 2 thereof, the frame structure 10 will be hidden from sight, and will not be visible to the casual observer. When installed in a vehicle 5, the frame structure 10 will strengthen the upper roof portion 1 thereof, and will resist oscillation of the vehicle roof when the sunroof panel 4 is open.

The support frame structure 10 is provided for use in a roof portion 1 of a vehicle body, in a vehicle 5 equipped with a sunroof 4 or other movable roof panel. The support frame structure 10 of FIGS. 2–3 is substantially symmetrical with respect to a longitudinal axis A thereof. The main core of the frame structure 10 may be made out of a single sheet of steel or other sheet metal which is stamped into a three-dimensional configuration.

Panel Enclosure

A reinforcing frame structure 10, according to the present invention, necessarily includes a panel enclosure 12 having a panel opening 14 formed therein, for supporting a roof panel. The panel enclosure 12 in the depicted embodiment includes a front portion 16, two opposed side portions 18, 20 and an intermediate portion 22. The intermediate portion 22 is designated as such herein because of its intermediate location near the middle of the frame structure 10.

The panel enclosure 12 may have a front extension bracket 15 attached to, and extending forwardly from the front portion 16 thereof, for interconnecting the frame structure 10 to other parts of the vehicle body. Similarly, the frame structure 10 may have a rear extension bracket 17 attached to, and extending rearwardly from a rear crossmember 36 thereof, for interconnecting the frame structure 10 to other parts of the vehicle body.

Figure 5:
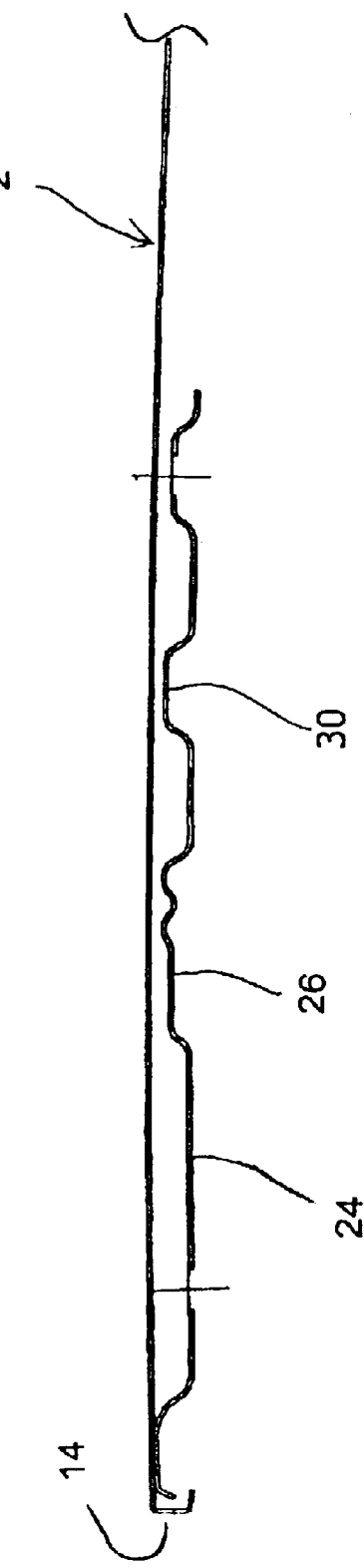
FIG. 5 is a detail view of the portion of the structure and roof panel of FIG. 4 contained within the circled area thereof.

The intermediate portion 22 may be made with adjacent sections thereof offset from one another, including a first part 24 adjacent the panel opening 14 and disposed at a first level, and a second part 26 spaced away from the panel opening and disposed at a second level which is different from the first level. In the depicted embodiment, and as shown in the cross-sectional view of FIG. 5, the first part 24 may be situated at a first level for placement spaced away from the vehicle upper roof panel 2 and substantially parallel thereto, and the second part 26 may be situated at a second level, elevated above the first level.

In the depicted embodiment, the second part 26 is substantially symmetrical with respect to the longitudinal axis A of the structure. An arcuate border is provided to interconnect the first and second parts. The border will be seen to have an undulating shape in FIG. 3, so that each side of the second part 26 is widest at the outside edges thereof, tapers back and then extends out again as it moves towards the center, and then tapers back again to a narrow area at the center point thereof.

Side Rails

The support frame structure 10 may include a pair of opposed, spaced-apart side rails 11, 13 running along the outer side edges thereof. Where used, the side rails 11, 13 are preferably integrally formed with, or affixed to the panel enclosure 12. In the embodiment of FIGS. 1–3, the side rails 11, 13 are linear extensions of the panel enclosure side portions 18, 20.

Crossmembers

Figure 4:
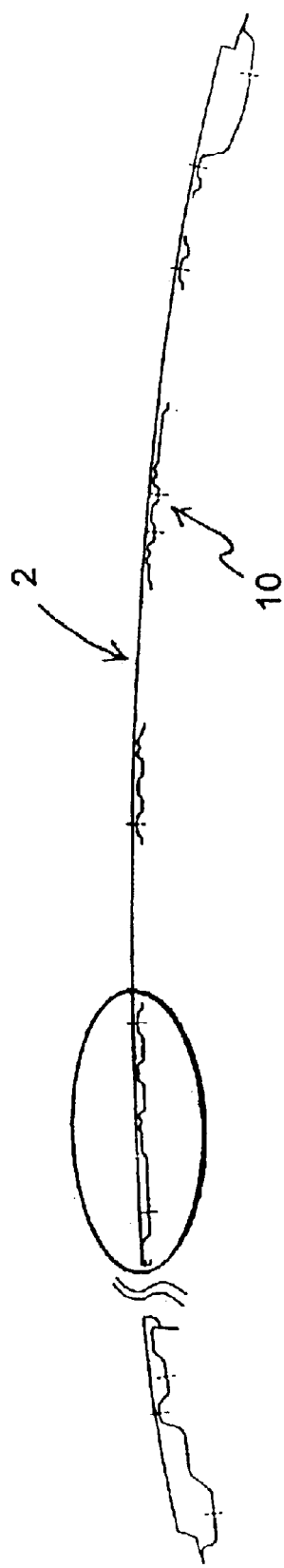
FIG. 4 is a cross-sectional view of the reinforcing frame structure of FIG. 1, taken along the longitudinal axis thereof, and also showing the upper roof panel of a vehicle in which the frame structure is installed.

In the depicted embodiment, the reinforcing frame structure 10 also includes a plurality of crossmembers 30, 32, 34 and 36, which are oriented substantially transverse to the longitudinal axis A of the frame structure. The forwardmost crossmember 30 is integrally attached to the intermediate portion 22 of the panel enclosure 12. The crossmembers 30, 32, 34, and 36 are provided to strengthen and reinforce the roof structure of a vehicle, when installed therein. Optionally, each of the crossmembers may be formed with a corrugated cross-sectional shape, as seen best in the cross-sectional views of FIGS. 4–5.

While four crossmembers 30, 32, 34, and 36 are shown in the embodiment of FIGS. 1–2, the number of crossmembers used is not critical. It will be understood that by widening the crossmembers, the total number thereof may be reduced.

Brace and Web Segments

In a particular embodiment of the invention, the reinforcing frame structure 10 also includes a brace 40, which is operatively interconnected to the panel enclosure 12 by the forwardmost crossmember 30. The brace 40 may be viewed as being made up of a number of cooperating web segments such as the segments shown at 41, 43, and 45, which extend between adjacent crossmembers in the embodiment of FIGS. 1–2. Some of these web segments such as 41 may be substantially parallel to the longitudinal axis A, while other segments such as 43 and 45 may, respectively, be situated along a line which is disposed at an angle with respect to the longitudinal axis. These segments 43, 45 are non-parallel relative to the longitudinal axis A, and are also non-perpendicular to the longitudinal axis.

The structure 10 may include other web segments extending between adjacent crossmembers, as desired. Examples of some other web segments include the web segments 47 which each have a substantially triangular outline shape, with the wide parts thereof facing toward the panel opening 14.

In the embodiment of FIGS. 1–2, the brace 40 includes a tapered portion which has a narrow end 42 adjacent the panel enclosure 12, and a wide end 44 spaced away from the panel enclosure. This tapered portion is believed to add strength and stability to the overall structure, particularly since it is operatively connected to a central area of the intermediate portion 22.

In the depicted embodiment, the narrow end 42 of the brace 40 is integrally formed with, and connects up to the first crossmember 30, which, in turn, is integrally attached to the intermediate portion 22 of the panel enclosure 12.

The forwardmost portion of the brace 40 includes two closely spaced, web segments 41, 42 extending between the first and second crossmembers 30, 32. These web segments 41, 42 are parallel to each other and to the longitudinal axis A. The central portion of the brace 40 is formed by two spaced apart angularly divergent web segments extending between the second and third crossmembers 32, 34. These web segments are shown at 43. The rear portion of the brace 40 is formed by two more angularly divergent web segments 44, 45 which are in line with the respective web segments 43 of the central portion. These web segments 44, 45 extend between the third and fourth crossmembers 34, 36.

The brace 40, where used, may include a portion which is substantially triangular in shape, or may include a portion which is a modified triangle, with the opposed side edges thereof having a curved shape, and being bowed outwardly. Other shapes may be used, as desired.

Some of the reinforcing web segments, such as the segment 47, may have a triangular outline shape for added strength. The wide end of these segments faces toward the panel opening 14.

Although the present invention has been described herein with respect to a limited number of presently contemplated embodiments, the foregoing description is intended to be illustrative, and not restrictive. Those skilled in the art will realize that many modifications of the disclosed embodiments could be made which would be operable. All such modifications, which are within the scope of the claims, are intended to be within the scope and spirit of the present invention.

Having, thus, described the invention, what is claimed is:

1. A reinforcing frame structure for installation in a roof section of a vehicle body, said frame structure having a central longitudinal axis and comprising:
    a panel enclosure for supporting a movable roof panel, said panel enclosure having an opening formed therein;
    a plurality of substantially parallel spaced-apart crossmembers, at least one of said crossmembers being operatively attached to said panel enclosure; and
    a plurality of web segments, each of said web segments attached to and forming a bridge between two adjacent crossmembers;
    wherein at least two of said web segments are non-parallel to, and are substantially symmetrical with respect to the central longitudinal axis of said structure, and diverge angularly outwardly in a front to rear direction, from an area proximate said central longitudinal axis.

2. The reinforcing frame structure of claim 1, wherein some of said web segments cooperate to form a pattern which includes a tapered component.

3. The reinforcing frame structure of claim 2, wherein said tapered component includes a narrow end which faces toward said roof panel enclosure, and a wide end spaced away from said roof panel enclosure.

4. The reinforcing frame structure of claim 2, wherein the tapered component is substantially triangular.

5. The reinforcing frame structure of claim 1, wherein the web segments and crossmembers cooperate to form a pattern which is substantially symmetrical with respect to said longitudinal axis.

6. The reinforcing frame structure of claim 1, wherein the panel enclosure comprises an intermediate portion comprising a first part adjacent said opening and disposed at a first level, and a second part spaced away from said opening and disposed at a second level which is different from the first level.

7. The reinforcing frame structure of claim 6, wherein said first and second parts of said intermediate portion have and arcuate border therebetween.

8. The reinforcing frame structure of claim 6, wherein the web segments and crossmembers cooperate to form a pattern which includes a tapered component.

9. A reinforcing frame structure for installation in a roof section of a vehicle body, said frame structure having a central longitudinal axis and comprising:
    a panel enclosure for supporting a movable roof panel, said panel enclosure having an opening formed therein;
    the panel enclosure comprising an intermediate portion having a first part adjacent said panel opening and disposed at a first level, and a second part spaced away from said panel opening and disposed at a second level which is different from the first level; and
    a brace operatively attached to said panel enclosure and being substantially symmetrical in relation to said longitudinal axis, said brace comprising two segments which diverge angularly outwardly in a front to rear direction, from an area proximate said longitudinal axis.

10. The reinforcing frame structure of claim 9, wherein said first and second parts of said intermediate portion have an arcuate border therebetween.

11. The reinforcing frame structure of claim 9, further comprising at least one crossmember which extends across said frame structure substantially perpendicular to the longitudinal axis thereof.

12. A reinforcing frame structure for installation in a roof section of a vehicle body, said frame structure having a longitudinal axis and comprising:
    a panel enclosure for supporting a movable roof panel, said panel enclosure having an opening formed therein;
    a brace operatively attached to said panel enclosure, the brace being substantially symmetrical in relation to said longitudinal axis and comprising a plurality of segments,
    said brace comprising two segments which diverge angularly outwardly in a front to rear direction from an area proximate said longitudinal axis.

13. The reinforcing frame structure of claim 12, wherein said brace includes a tapered portion having a narrow end adjacent said panel enclosure and a wide end spaced away from said panel enclosure.

14. The reinforcing frame structure of claim 12, wherein said brace includes a substantially triangular portion.

15. The reinforcing frame structure of claim 12, wherein said panel enclosure includes and intermediate portion having a first part adjacent said panel opening and disposed at a first level, and a second part spaced away from said panel opening and disposed at a second level which is different from the first level.

16. The reinforcing frame structure of claim 12, further comprising at least one crossmember which extends across said frame structure substantially perpendicular to the longitudinal axis thereof.

17. The reinforcing frame structure of claim 15, wherein said first and second parts of said intermediate portion have an arcuate border therebetween.

18. A reinforcing frame structure for installation in a roof section of a vehicle body, said frame structure having a longitudinal axis and comprising:
    a panel enclosure for supporting a movable roof panel, said panel enclosure having an opening formed therein;
    a brace operatively attached to said panel enclosure, the brace comprising a plurality of segments, at least one of said segments disposed in an orientation which is non-parallel to the longitudinal axis of the frame structure, and further which is non-perpendicular to said longitudinal axis;
    wherein said panel enclosure includes an intermediate portion having a first part adjacent said panel opening and disposed at a first level, and a second part spaced away from said panel opening and disposed at a second level which is different from the first level,
    wherein the second part of said intermediate portion is substantially symmetrical, wherein the first and second parts have an arcuate border therebetween, and wherein each side of the second part is widest adjacent the outside edges thereof, narrows and then widens again as it moves towards the center, and tapers to a narrow area at the center thereof.

19. A vehicle comprising a roof with an upper roof panel and a reinforcing frame structure disposed below said upper roof panel, said reinforcing frame structure having a central longitudinal axis and comprising:
    a panel enclosure for supporting a movable roof panel, said panel enclosure having and opening formed therein;

a plurality of substantially parallel spaced-apart crossmembers, at least one of said crossmembers being operatively attached to said panel enclosure; and a plurality of web segments, each of said web segments attached to and forming a bridge between two adjacent crossmembers;

wherein at least two of said web segments are non-parallel to, and are substantially symmetrical with respect to the central longitudinal axis of said structure, and diverge angularly outwardly in a front to rear direction from an area proximate said central longitudinal axis.

20. A vehicle comprising a roof with an upper roof panel and a reinforcing frame structure disposed below said upper roof panel, said reinforcing frame structure having a central longitudinal axis and comprising:

a panel enclosure for supporting a movable roof panel, said panel enclosure having and opening formed therein;

the panel enclosure comprising an intermediate portion having a first part adjacent said panel opening and disposed at a first level, and a second part spaced away from said panel opening and disposed at a second level which is different from the first level; and a brace operatively attached to said panel enclosure and being substantially symmetrical in relation to said longitudinal axis, said brace comprising two segments which diverge angularly outwardly in a front to rear direction from an area proximate said longitudinal axis.

21. A vehicle comprising a roof with an upper roof panel and a reinforcing frame structure disposed below said upper roof panel, said reinforcing frame structure having a central longitudinal axis and comprising:

a panel enclosure for supporting a movable roof panel, said panel enclosure having an opening formed therein;

a brace operatively attached to said panel enclosure, the brace being substantially symmetrical in relation to said longitudinal axis and comprising a plurality of segments, said brace comprising two segments which diverge angularly outwardly in a front to rear direction from an area proximate said longitudinal axis.

* * * * *